INVENTORS.
WILLIAM E. MOTT &
DONALD F. RHODES

United States Patent Office 3,437,809
Patented Apr. 8, 1969

3,437,809
NEUTRON TRANSMISSION METHOD OF ANALYSIS AND APPARATUS THEREFOR
William E. Mott, O'Hara Township, Allegheny County, and Donald F. Rhodes, Plum Borough, Pa., assignors to Gulf Research & Development Company, Pittsburgh, Pa., a corporation of Delaware
Filed July 6, 1965, Ser. No. 469,660
Int. Cl. G01t 3/02
U.S. Cl. 250—83.1                    18 Claims

ABSTRACT OF THE DISCLOSURE

A neutron transmission method of quantitative analysis yielding high accuracy and precision by use of a high neutron count, a signal to noise ratio of at least 3.0, accurate determination of the noise of the system, expression of the concentration as a function of transmitted neutrons and relation of that function to the neutron scattering cross section of the elements present in the sample so as to reduce the effect of the noise upon the results.

Figure 1:
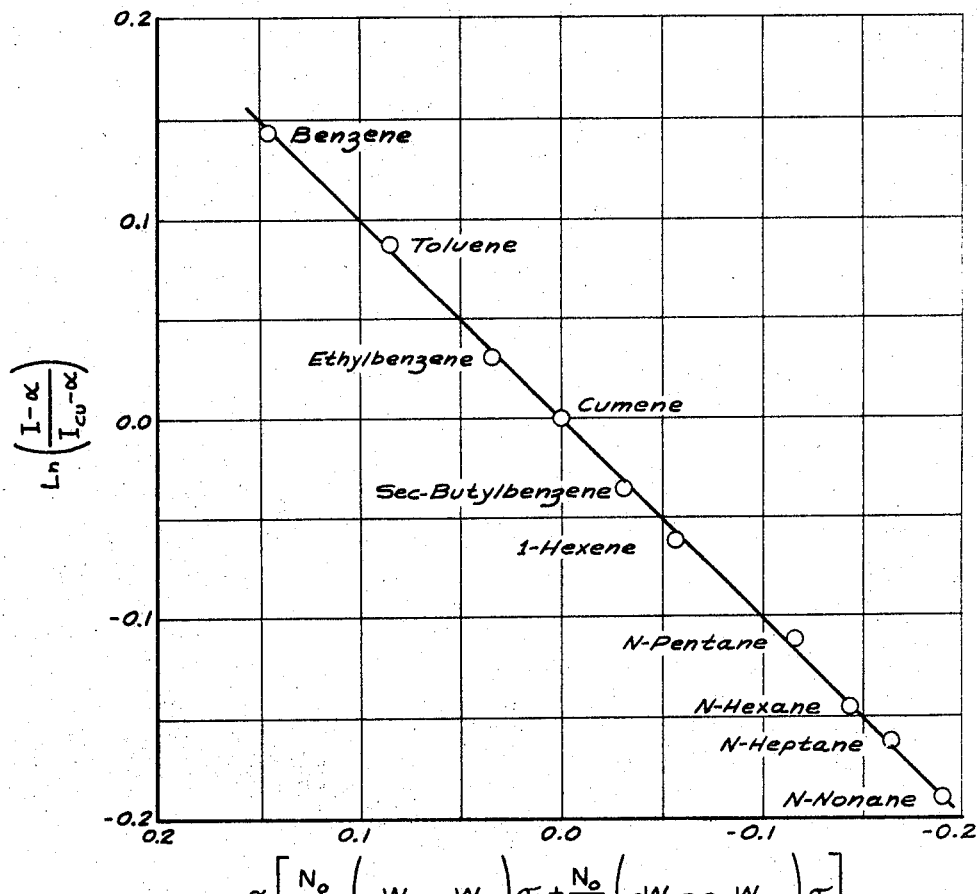

An apparatus for measuring the number of neutrons transmitted through a sample which provides a beam of substantially parallel thermal neutrons to the sample and a beam of substantially parallel neutrons transmitted through the sample to a detector. The apparatus is shielded to exclude the effect of neutrons other than transmitted neutrons and is adjusted to provide a signal to noise ratio of at least 3.0.

---

This invention relates generally to a method and apparatus for measuring the number of thermal neutrons transmitted through a material interposed in a beam of neutrons. In particular this invention concerns a method and apparatus for determining the hydrogen concentration in a material by measuring the number of thermal neutrons transmitted through a sample of such material.

There have been described in the literature various methods and apparatus for chemical analysis based on the phenomenon of neutron transmission through a material. An example of such methods and apparatus is described in a paper entitled "Determination of Carbon-Hydrogen Ratios by Neutron Scattering," H. L. Finston and E. Yellin, Analytical Chemistry, vol. 35, No. 3, March 1963, pages 336-340. The reference describes a method and an apparatus for determining the hydrogen concentration in a hydrocarbon to within 0.1 percent by weight. In one apparatus described by Finston and Yellin, fast neutrons from a mixture of plutonium and beryllium are slowed down by passage through heavy water and are then passed through a sample of material having an unknown concentration of hydrogen and having a thickness of 0.32 or 1.0 centimeter. The transmitted neutron beam is measured by a detector consisting of a boron trifluoride proportional counter, and the beam is collimated by passage through cadmium orifice plates interposed between the neutron source and the sample cell. The apparatus is shielded with cadmium, and counting rates of approximately 3,000 counts per minutes are measured at room temperature constant to about −1° C. Based on the counting rate of transmitted neutrons and the density of the unknown material, which is measured by extraneous means, hydrogen concentration is calculated mathematically to within 0.1 percent by weight.

Although the method and apparatus described by Finston and Yellin indicate the possibility of determining hydrogen concentration in a material, their method and apparatus are not entirely satisfactory because the accuracy and precision thereof are too limited. Only neutrons that are transmitted through the test sample without scattering should be considered when accurate neutron counts and analytical determinations are desired, but the Finston et al. method and apparatus are relatively nonselective for transmitted neutrons as compared to scattered and stray neutrons. As a result, the accuracy and precision of the Finston et al., transmitted neutron measurements and analytical determinations are inherently limited.

The present invention relates to an improved method and apparatus for measuring the transmission of neutrons through a target material with an unusually high precision and accuracy, whereby exceptionally precise analytical determinations for hydrogen in hydrocarbons and other materials up to one part in 5,000 or more can be made. In accordance with the method of this invention, we have found that the above indicated benefits can be obtained by measuring the transmission of a neutron beam through a material and maintaining the magnitude of the neutron count desirably at a level of at least about 100,000 counts preferably measured at a rate of at least about 20,000 counts per minute while maintaining the ratio of signal to noise preferably at a level of at least about 3.0. In a highly preferred embodiment of this invention, the neutron counting rate is maintained within the range of from about 20,000 to about 200,000 counts per minute and the ratio of signal to noise is maintained within the range of from about 3.0 to about 10.0. In accordance with the apparatus of this invention there is provided a straight conduit having a longitudinal passage for conducting neutrons therethrough, a neutron source at one end of the conduit, a neutron detector at the other end of the conduit, neutron moderating and shielding material substantially surrounding the apparatus, and a sample cell secured within the conduit at a position between the source and the detector such that, while measuring a neutron count of at least about 100,000, preferably measured at a rate of at least about 20,000 counts per minute, the signal to noise ratio is maintained at a level preferably of at least about 3.0. In a preferred embodiment of the apparatus of this invention, a plug of neutron moderating material is encased in the conduit between the source and the sample cell.

In the accompanying drawings, FIGURE 1 is a typical calibration curve based on data obtained for standard reference materials suitable for use with the method and apparatus of this invention.

Figure 2:
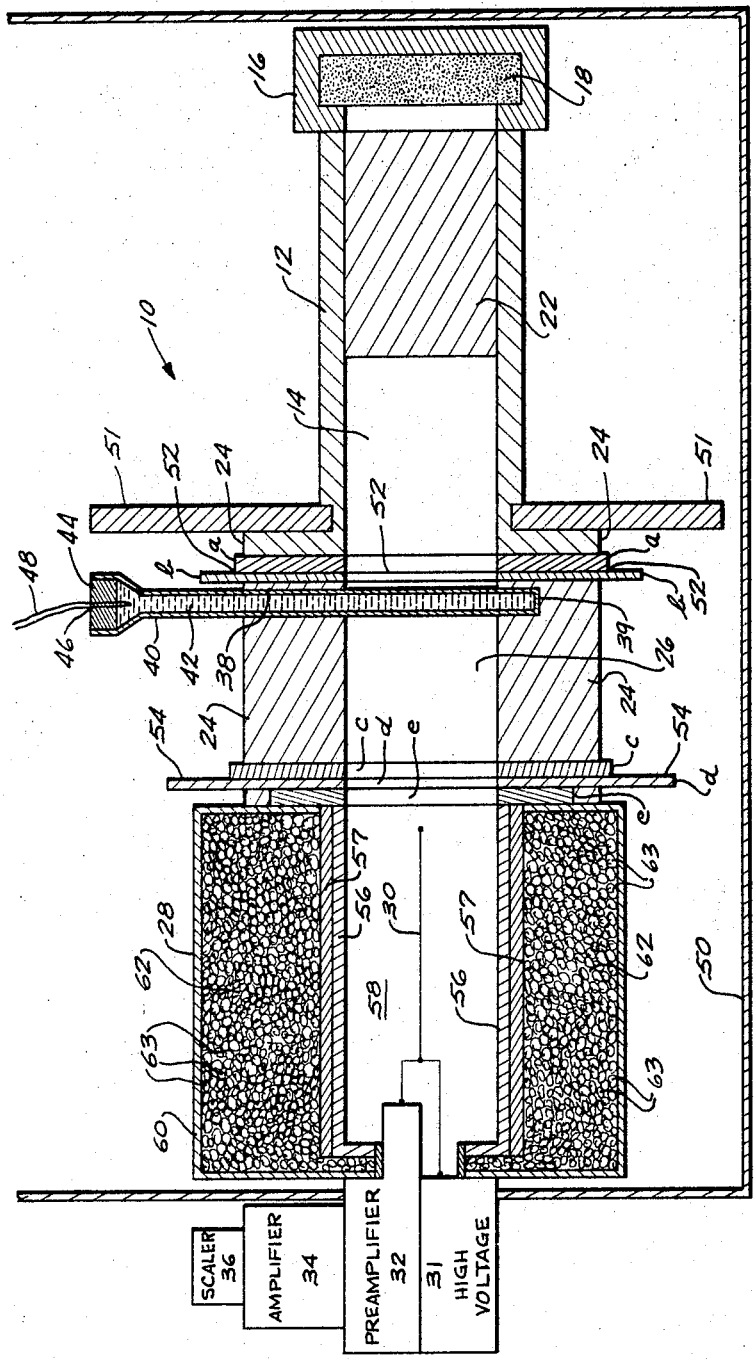

FIGURE 2 is a diagrammatic representation of the essential components of a particular embodiment of the apparatus of this invention.

As background to assist in the understanding of this invention, it should be noted that neutrons can be classified as fast or thermal (i.e.; slow) depending upon their energy. The term "thermal neutrons" is used hereafter in this specification to describe those neutrons having an energy of about one electron volt or less, and the term "fast neutrons" is used hereinafter to describe those neutrons having an energy greater than about one electron volt. In addition, a "thermal neutron distribution" is defined herein as a group of neutrons in which a substantial number of the neutrons have energies equal to or less than about one electron volt.

As a beam of neutrons passes through a material, an individual neutron might pass undisturbed directly through the material or might interact with the atomic nuclei in the material and thereby be absorbed or scattered. The probability of a neutron interacting with an atomic nucleus depends upon the energy of the neutron and the composition and structure of the nucleus. Ordinarily, the effective area of a nucleus available for interaction with neutrons passing near the atom is larger than the actual physical area of the nucleus. Such effective area of a nucleus is referred to as the cross section and is defined in units of barns having the dimensions of length squared. By definition, one barn is equal to $1 \times 10^{-24}$ centimeter squared. The cross section characteristic of a particular chemical element varies with the energy of neutrons passing through a material containing that element. For example, for neutrons having energies within the range of from 100 to 0.01 million electron volts, the scattering cross section of the hydrogen nucleus varies from 0.1 barn to approximately 20 barns. In the neutron energy range from 0.01 million electron volt to near the region of 1.0 electron volt, the hydrogen cross section remains constant at approximately 20 barns; then, as the neutron energy decreases further, the hydrogen cross section increases to approximately 80 barns at 0.003 electron volt.

When neutrons pass through a target material, the beam of neutrons leaving the material comprises substantially three classes of neutrons, among which are fast neutrons which are of little interest herein because they are not detectable by the commonly used detecting means that will be discussed more fully below. A second class of neutrons contained in the beam emitted from the material comprises those thermal neutrons that pass substantially directly through the target material without interacting with nuclei of the material; such neutrons are referred to herein as "transmitted neutrons." A third component of the emitted neutron beam comprises scattered thermal neutrons that have undergone interactions with nuclei and still travel substantially within the path taken by the transmitted neutrons.

Hereinafter, when a particular target material is described as "a material of unknown composition," that statement is intended to indicate that, although the density of the material and the elements contained therein are known, the concentration of at least one of those elements in the material is not known and is to be determined.

The "neutron count" denotes the total number of neutrons detected in a given interval of time and comprises the sum of two detected quantities referred to herein as signal and noise. The term "signal" is used herein to denote that portion of the neutron count that is responsive to the number of transmitted neutrons in the beam of neutrons that are emitted from the target material and enter the detecting means. Therefore, the term "signal" does not include those neutrons which take part in one or more interactions with nuclei contained in the target material and subsequently enter the detecting means.

The term "noise" is used herein to denote that portion of the neutron count that is responsive to the number of non-transmitted neutrons entering the detecting means by any path other than a path of transmission substantially directly through the material. Therefore the noise sensed by the detecting means includes not only those neutrons involved in interaction with nuclei in the target material and which subsequently enter the detecting means, but also includes those neutrons that enter the detecting means from sources extraneous to the apparatus used with the process of this invention.

The term "counting time" is used herein to denote a continuous period of time during which the number of neutrons entering the detecting means is recorded thereby.

It has been found that the number of neutrons measured by a particular detector after transmission through a target material is determined by the interrelation of many independent variables in the physical system involved. Those independent variables include the rate of emission of neutrons from the neutron source, the energy of the neutrons passing through the material, the nature of the elements comprising the target material, the concentrations of those elements in the target material, the density of the target material, and the geometry of the physical system. Because of the complexity of the interrelationship among those variables, the transmission of neutrons through a target material cannot be accurately described quantitatively by a purely analytical mathematical expression, but is measured by empirical methods founded upon the statistical probability of the occurrence in the material of neutron interactions such as absorption or scattering.

In accordance with this invention it has been discovered that a very precise and accurate measurement of the intensity of a beam of transmitted neutrons can be obtained and used to determine the concentration of hydrogen in a material with a precision of 0.01 percent by weight standard deviation and that such measurements can be made with an accuracy of at least 0.3 percent difference from the actual value if certain minimal requirements are observed regarding the magnitude of the neutron count and the relative magnitudes of the detected signal and noise. Specifically, the magnitude of the neutron count desirably is at least about 100,000, preferably measured at a rate of at least about 20,000 counts per minute while the ratio of signal to noise desirably is maintained equal to at least about 3.0. There are definite practical limitations involved in producing high neutron counts and in reducing noise to extremely low intensities. Therefore it is highly preferred that the neutron count be measured at rates within the range of from about 20,000 to about 200,000 counts per minute while the ratio of signal to noise is maintained within the range of from about 3.0 to about 10.0.

This invention provides a method and an apparatus for obtaining very accurate and precise measurements of the intensity of a transmitted neutron beam, and that method and apparatus are applicable to the determination of the concentrations of elements in a material of unknown composition. The manipulative steps of the method are the same regardless of the composition of the material being analyzed and those steps are described herein with reference to the method employed in determining the concentration of hydrogen in a hydrocarbon. The method comprises passing a beam having a thermal neutron distribution through a sample of an unknown hydrocarbon to a detecting means. The orientation and position of the hydrocarbon sample between the source and the detecting means is adjusted to assure that the neutron count and the ratio of signal to noise are within the limits specified above.

The neutron source can be any means capable of emitting neutrons such as a nuclear reactor, a cyclotron, a neutron accelerator, or a radioactive source material containing a mixture of substances, at least one of which is radioactive. The radioactive source materials are preferred for use with this invention because of the stability of the rate of neutron emission from such materials and because of their compactness and ease of handling. Examples of suitable radioactive source materials are a mixture of polonium and beryllium which has a half life of 138 days and a rate of emission of $2.5 \times 10^6$ neutrons per curie per second and a mixture of radium and beryllium which has a half life of 1622 years and a rate of emission of $1.3 \times 10^7$ neutrons per curie per second. The number of neutrons emitted in a given time period from a radioactive source material is a statistical phenomenon, and it is desirable that the radioactive source material be capable of providing a relatively high rate of neutron emission that is substantially constant for long periods of time, and at least during the counting time employed. Therefore a preferred radioactive source material is a mixture of plutonium 239 and beryllium which has a half life of 24,600 years and a rate of neutron emission of $1.7 \times 10^6$ neutrons per curie per second. Another preferred radioactive source material is a mixture of americium and beryllium which has a half life of 458 years and a rate of neutron emission of $2.0 \times 10^6$ neutrons per curie per second. In any event, the particular neutron source employed does not constitute a critical element of this invention as long as the source is capable of providing a substantially constant rate of emission that provides at least the minimum desirable neutron count at the detector. A suitable rate of neutron emission from the source has been found to be one that is equal to at least about $5 \times 10^6$ neutrons per second. Thus with a mixture of plutonium 239 and beryllium, for example, it is desirable that at least about 3.0 curies of the radioactive source material be employed.

The plug of moderating material encased in the conduit can comprise any material capable of scattering and thermalizing the neutrons emitted from the source in the direction of the sample cell. Examples of such materials that are suitable for use with the process of this invention are heavy water, graphite, paraffin, and polystyrene. Paraffin and polystyrene are preferred scattering materials because their physical state provides greater ease of handling. As is the case with the neutron source, the choice of any particular moderating material in the conduit is not critical to the inventive concept disclosed herein; therefore, any moderating material can be used, or the plug of moderating material can be omitted, as long as the beam of neutrons passing through the target material contains a distribution of neutrons substantially within the range of thermal energies. In some instances, failure to use any plug of moderating material increases the noise to an intolerable intensity. In some other instances, the use of too much moderating material reduces the intensity of the neutron beam, and of the measured signal, to an undesirable degree. In many embodiments of this invention, the use of from about one to about four inches of moderating material between the source and the sample has proved satisfactory.

The neutron detecting means used with this invention comprises a detector in combination with electronic amplification means to amplify the output responses produced by the detector and a scaler or other recording means capable of producing a visual record of the neutron count. The neutron detector can be a counter that is lined with boron or lithium or a proportional counter filled with gaseous boron trifluoride or the isotope of helium having mass three. Any detecting means capable of detecting thermal neutrons and of producing an intelligible output record is suitable for use with the process of this invention.

According to the process of this invention, the concentration of hydrogen in a hydrocarbon can be calculated as a function of the number of neutrons transmitted through a sample of the hydrocarbon by solution of the following equation:

$$\mathrm{Ln}\left(\frac{I-\alpha}{I_0-\alpha}\right) = -x\left[\frac{N_0}{A_H}\rho W_H \sigma_H + \frac{N_0}{A_C}\rho W_C \sigma_C\right] \quad (1)$$

where:

$I$ = the number of neutrons counted during a given counting time,
$I_0$ = the number of neutrons counted with an empty sample cell for the given counting time,
$\alpha$ = a factor which takes into account the effect of ambient extraneous neutrons and scattered neutrons that are counted by the detector,
$x$ = the sample cell thickness,
$N_0$ = Avogadro's number.

$A_H$, $A_C$ = the atomic weights of hydrogen and carbon, respectively,
$\rho$ = the density of the material,
$W_H$, $W_C$ = the weight fractions of hydrogen and carbon, respectively, in the material, and
$\sigma_H$, $\sigma_C$ = the neutron scattering cross sections for hydrogen and carbon, respectively.

An equation similar to Equation 1 has been used in the prior art to calculate hydrogen concentration from the count of neutrons transmitted through a hydrogen-containing material. However, the prior art methods have employed an equation which does not contain the term, $\alpha$, that is included in Equation 1 to account for those neutrons which enter the detector without passing through the sample cell as well as those neutrons which undergo one or more interactions in the sample cell before reaching the detector.

When dealing with a hydrocarbon, the weight fraction of carbon, $W_C$, can be expressed mathematically as:

$$W_C = 1 - W_H \quad (2)$$

Then Equation 1 can be rewritten and solved for the weight fraction of hydrogen as follows:

$$W_H = \frac{1}{xN_0\left[\frac{\sigma_C}{A_C} - \frac{\sigma_H}{A_H}\right]\rho}\left[\mathrm{Ln}\left(\frac{I-\alpha}{I_0-\alpha}\right) + xN_0\frac{\sigma_C}{A_C}\rho\right] \quad (3)$$

The numerical value of the term $\alpha$, is primarily dependent on the geometric relationships and spacing of the physical system. The values of $\sigma_H$ and $\sigma_C$ are dependent primarily upon the neutron energy. Therefore, if the density, $\rho$, of the material is known, Equation 3 contains the four unknown quantities consisting of $\alpha$, $\sigma_H$, $\sigma_C$ and $W_H$, the weight fraction of hydrogen. Before the hydrogen concentration of a material can be determined by neutron transmission, a series of calibration tests are made to determine the specific values of the constants $\sigma_H$ and $\sigma_C$ and $\alpha$ for the series of tests to be performed. The calibration measurements are made using a number of standard materials, the compositions and densities of which are known to a high degree of accuracy. A typical example of such calibration data is shown in FIGURE 1.

Generally, when this invention is applied in practice, it is probable that the concentration of an element, such as hydrogen, is likely to fall within a particular expected range of concentrations. It is desirable in such instances to reduce the range of investigation as much as is practicable. Therefore, it is the usual practice to choose a group of standard reference materials having various concentrations of the unknown element that cover the range of concentrations expected in the material for which the concentration is to be determined. It is also desirable to normalize the reference data to a datum obtained for a material substantially intermediate within the range of data obtained. When applying these principles to the determination of hydrogen in a hydrocarbon obtained by refining crude petroleum, it is often convenient to normalize the data obtained for the standard materials to a reference datum such as the count of transmitted neutrons passing through a representative intermediate material such as cumene. In the normalization of such reference data, Equations 1 and 3 are modified, respectively, as follows, where the subscript, $cu$, refers to the respective values for cumene:

$$\mathrm{Ln}\left(\frac{I-\alpha}{I_{cu}-\alpha}\right) = -x\left[\frac{N_0}{A_H}(\rho W_H - \rho_{cu}W_{H_{cu}})\sigma_H + \frac{N_0}{A_C}(\rho W_C - \rho_{cu}W_{C_{cu}})\sigma_C\right]$$

(1a)

$$W_H = \frac{1}{xN_0 \left[\frac{\sigma_C}{A_C} - \frac{\sigma_H}{A_H}\right]\rho} \left[\text{Ln}\left(\frac{I-\alpha}{I_{cu}-\alpha}\right) + xN_0\frac{\sigma_C}{A_C}\rho - x\rho_{cu}W_{H_{cu}}\frac{N_0}{A_H}\sigma_H - x\rho C_{cu}\frac{W_{C_{cu}}}{A_C}\sigma_C\right]$$

(3a)

When such a procedure is followed in the preparation of a graphical representation of standard reference data as presented in FIGURE 1, the data points obtained closely approximate a straight line passing through the reference point obtained for the datum material and spanning a narrow range of compositions for the element to be determined. Such results are represented in the graph of FIGURE 1, in which the straight line shown passes through the point obtained for cumene. FIGURE 1 shows a plot of the natural logarithm of the ratio of the neutron count as expressed in the left side of Equation 1a as a function of the composition of the test material as expressed in the right side of Equation 1a. In the preparation of FIGURE 1, ten hydrocarbons were used, each containing hydrogen in a concentration within the range of from 7.743 percent for benzene to 15.719 percent for n-nonane. The normalization data was that for cumene, having a hydrogen concentration of 10.064 percent.

Using the standard materials of known composition, the sample cell is filled with a material sample and the temperature of the material in the sample cell is allowed to equilibrate with the ambient temperature. The temperature in the sample cell is monitored with a thermocouple and recorded on a strip chart recorder. After the temperature of the sample has equilibrated with the ambient temperature, neutrons are passed through the sample and a count of the transmitted neutrons is taken to determine the value of the term, I.

The values of $\alpha$, $\sigma_H$ and $\sigma_C$ are determined by applying a least squares technique to the solution of Equation 1 or 1a. First $I_0$ is determined by measuring the neutron count for an empty sample cell. Then, for each of the samples having known weight fractions of hydrogen and carbon, the neutron count, I, is measured for a counting time having the same duration as that used to determine $I_0$. Next, a value of $\alpha$ is assumed and the corresponding values of $\sigma_H$ and $\sigma_C$ are calculated for the standard materials using the measured values of I and $I_0$. When normalized data is used, the I value of the normalization point is used in place of $I_0$.

The calculations are performed in a manner to determine the values of $\sigma_H$ and $\sigma_C$ for the assumed value of $\alpha$ which give the minimum sum of the squares of the differences between the quantities on opposite sides of the equal sign in Equation 1 or 1a. Additional values of $\alpha$ are then assumed and the calculation of a set of $\sigma_H$ and $\sigma_C$ are performed for each value of $\alpha$. Then each best-least-squares set of $\alpha$, $\sigma_H$ and $\sigma_C$ is used in the calculation of the weight fraction of hydrogen as expressed by Equation 3 or 3a for each of the standard samples. The preferred values of $\alpha$, $\sigma_H$ and $\sigma_C$ are selected on the basis of the criterion that the sum of the squared relative differences between the true and calculated values of hydrogen concentration must be a minimum. With the values of $\alpha$, $\sigma_H$ and $\sigma_C$ thus determined, the procedure for obtaining a count of neutrons transmitted is repeated using a sample of the unknown material, and the concentration of hydrogen in that material is calculated using Equation 3 or 3a. The carbon concentration then can be calculated by difference using Equation 2.

The total counting time employed is not a critical element of this invention except in the respect that the counting times are preferably equal for the measurement of the neutron transmission through the normalizing and reference materials as well as through the unknown material and in the respect that the total neutron count desirably is equal to at least 100,000 counts preferably measured at a rate of at least 20,000 counts per minute while the signal to noise ratio is maintained preferably at a level of at least 3.0. If unequal counting times are used for any reason, they can be adjusted for comparison by calculating, for each sample tested, an average neutron count for a fixed unit time that is the same for each measurement and comparing those values, or equivalent multiples of each of those values, for each sample tested.

The total neutron count is read from the scaler at the end of the counting time. Alternatively, the data for the neutron count can be read automatically into suitable computing apparatus, such as a digital computer. Because the term, $\alpha$, represents the noise detected during the counting time, and because the signal is, by definition, equal to the difference between the neutron count and the noise, the value of the signal to noise ratio can be determined for a particular neutron transmission measurement by evaluating the quantity $(I-\alpha)/\alpha$. If the ratio of signal to noise is less than 3.0, or the neutron count is too low, the position of the sample between the detector and the source is adjusted, or other changes in procedure or operating conditions are made, until a measurement conforming to the above specified limitations is obtained.

The density of the material can be determined by any conventional method. For example, the density can be determined using a gamma ray transmission guage or by using the Bingham pycnometer method or the Lipkin bicapillary pycnometer method, both of which have been adopted by the American Society for Testing and Materials. The temperature at which the density is measured is determined and, if there is a discrepancy between the temperature of the sample for which the density was measured and the temperature of the material in the sample cell during the counting time, the density measurement is corrected to within 0.1° C. to obtain the density of the material through which neutrons were transmitted.

The use of the process of this invention enables the determination of hydrogen concentration to an accuracy of 0.3 percent difference from the actual value of hydrogen concentration and to a precision of 0.01 percent by weight standard deviation. The method of this invention differs from prior art methods in the maintenance of minimum requirements for the magnitude of the neutron count and of the signal to noise ratio and in the use and determination of the quantity, $\alpha$, which accounts for the effect of noise in the neutron measurement. The measurement of at least 100,000 neutrons, preferably counted at a rate of at least 20,000 counts per minute, assures that the number of thermal neutrons passing through the material within a reasonably short period of time is adequate to produce a number of neutron interactions with the atomic nuclei present sufficient to indicate the concentrations of the various interacting nuclei within limits of accuracy and precision as set forth above and much higher than the limtis of accuracy and precision attainable with the methods and apparatus of the prior art. In addition, the determination of $\alpha$, and ultimately of the ratio of signal to noise, provides an indication of whether or not the number of non-transmitted neutrons contributing to the neutron count is of such magnitude as to affect the precision and accuracy of the measurement significantly or to invalidate the measurement of transmitted neutrons. It should be noted also that, according to the prior art methods, although the calculation of hydrogen concentration is founded in theory on the number of transmitted neutrons counted, the terms I and $I_0$ in fact include non-transmitted neutrons as well. In contrast, calculations made employing the quantities measured by the method of this invention are based upon the terms $(I-\alpha)$ and $(I_0-\alpha)$, which terms represent more accurately the true count of only transmitted neutrons. Thus, the method of this invention conforms more closely to the theory underlying chemical analysis by measurement of neutron transmission.

The following explanation of a laboratory determination of the hydrogen content in a hydrocarbon demonstrates the use of the method of this invention. Ten hydrocarbons of known composition, ranging from 7.743 percent hydrogen for benzene to 16.7 percent hydrogen for n-pentane, were used as standard materials and cumene, containing 10.064 percent hydrogen, was used as the normalization point. The temperature variation during the measurements did not exceed ±0.1° C. For various assumed values of $\alpha$, the value of I was measured for each standard material and that data was used in the solution of Equation 1a on a digital computer to determine the best-least-squares values for $\alpha$, $\sigma_H$ and $\sigma_C$. It was thus determined that the best value of $\alpha$ was 50,000 counts for five minutes, while the best value of $\sigma_H$ was 26.8 barns and $\sigma_C$ was 4.70 barns. The measured value of $I_{cu}$ for cumene was 340,259 counts in five minutes. Pycnometer measurements yielded a density of cumene of 0.8603 gm./cc. and a density of the unknown hydrocarbon of 0.7759 gm./cc. at the temperature at which the transmission measurements were made. A five-minute neutron count for the unknown hydrocarbon gave a measured value of I equal to 290,214 counts, and the substitution of the above numerical values in Equation 3a gave a hydrogen concentration of 14.41 percent by weight. By difference from Equation 2, the carbon concentration was calculated as 85.59 percent by weight. For these measurements, the value of the signal to noise ratio, calculated as the ratio $(I-\alpha)/\alpha$, was equal to 4.8 for the unknown hydrocarbon and 5.8 for cumene.

For materials containing elements other than carbon and hydrogen the method of this invention is directly extendable by the addition of terms to the right side of Equation 1 or 1a. If the concentrations of those additional elements are known by other means, their effect can be taken into account in the calculation of the concentrations of hydrogen and carbon.

An embodiment of an apparatus suitable for performing the method of this invention is represented diagrammatically in FIGURE 2 which shows an apparatus, indicated generally by reference numeral 10, for measuring neutron transmission through a material. Apparatus 10 comprises a conductor tube 12 having a longitudinal passage 14 therethrough and a neutron source container 16 adjacent one end of tube 12 and containing a radioactive source material 18.

A plug 22 of neutron moderating material is encased within tube 12 adjacent container 16. Moderating plug 22 consists of any material capable of scattering and thermalizing the neutrons emitted from source material 18. The body of moderating plug 22 has a transverse dimension substantially equal to the transverse dimension of the interior of tube 12, and the length of moderating plug 22 is determined by the amount of such material required to scatter and thermalize a substantial number of the neutrons emitted by source material 18 in the direction of the sample cell.

A sample cell mounting means 24 is secured at the end of tube 12 remote from container 16 and comprises an outer shell of material capable of absorbing large quantities of thermal neutrons. Mounting means 24 has a longitudinal passage 26 extending therethrough and forms a continuous conduit with passage 14.

A detector 28 for thermal neutrons is attached to the end of mounting means 24 remote from tube 12. Detector 28 can be any means or apparatus suitable for sensing neutrons such as a proportional counter lined with boron or lithium or a proportional counter filled with gaseous boron trifluoride or the isotope of helium having an atomic weight of three. Detector 28 has therein a sensing element 30, connected to a high voltage power supply 31, that produces a change in electrical voltage responsive to interaction of thermal neutrons with the gas in the detector. Sensing element 30 is connected to electrical means adapted to convert the output response of sensing element 30 to a visual record. In FIGURE 2, the electrical means used to convert the output response from element 30 is represented diagrammatically as a preamplifier 32 connected to sensing element 30, an amplifier 34 connected to preamplifier 32 and a scaler 36 connected to amplifier 34. The particular type of amplification and response conversion apparatus employed is not critical to the inventive concept of the apparatus described herein, and any means suitable for producing a visual digital record from the output response of sensing element 30 can be used without departing from the concept of this invention.

Mounting means 24 has a slot 38 between the end of tube 12 and detector 28, and slot 38 is aligned with a groove 39 in the inner wall of mounting means 24 opposite slot 38. Slot 38 and groove 39 provide a receptacle to receive a sample cell 40 that contains a quantity of material 42 of unknown composition. Sample cell 40 has a closure means 44 at its upper end with a hole 46 through the closure means. A thermocouple lead 48 extends through hole 46 into material 42 contained in sample cell 40. Thermocouple lead 48 is connected to temperature recording apparatus (not shown in the drawing) that is used to obtain a continuous record of the temperature of material 42 during the neutron transmission counting time. The entire neutron transmission measuring apparatus 10, except for the output response conversion means, is immersed in a constant temperature bath of oil or water contained in a tank 50.

A neutron shield 51, made of a material such as cadmium or Boral that is capable of absorbing neutrons, is mounted around tube 12 near mounting means 24 to reduce the number of stray and scattered neutrons reaching detector 28. "Boral" is the trade name for a thermal neutron absorbing material made by hot rolling a compacted mixture of aluminum powder and boron carbide ($B_4C$) between two thin sheets of aluminum and is typically supplied in sheets $\frac{1}{8}''$ to $\frac{1}{4}''$ thick. As used throughout this specification the term "Boral" will be understood to mean this material. A first set of collimators 52 is enclosed within mounting means 24 between tube 12 and sample cell 40. The first set of collimators 52 consists of annular rings $a$ and $b$ that are made of a material such as cadmium or Boral that is capable of absorbing neutrons. Each ring has a central opening therein substantially equal to the transverse dimension of passage 14 through tube 12. Collimators 52 are employed to absorb stray and scattered neutrons and to direct a substantially parallel beam of neutrons to sample cell 40. The number of collimators 52 used is determined by the amount of space available between sample cell 40 and the end of tube 12.

A second set of collimators 54, comprising annular rings labeled $c$, $d$ and $e$ in FIGURE 2, is encased within mounting means 24 between detector 28 and sample cell 40. Collimators 54 are also constructed of material capable of absorbing neutrons and each of collimators 54 has a central passage therethrough having a diameter substantially equal to the diameter of the openings in collimators 52. The diameters of passage 14 in tube 12 and of the openings in the collimators are substantially equal to the sensitive diameter of the entry to the detector 28 to assure the effective and reliable operation of the detector in sensing the neutrons transmitted through sample cell 40 and material 42. Collimators 54 are employed to assure the entry of a substantially parallel beam of transmitted neutrons into detector 28 and to absorb stray and scattered neutrons. The number of collimators 54 is determined by the amount of space available between detector 28 and sample cell 40.

An important element of structure in apparatus 10 is the location of sample cell 40 and its contained material 42 with respect to the entry of detector 28 and the center of the source 18. To obtain accurate measurements of neutron transmission, it is important that sample cell 40 is secured between the entry of detector 28 and the center of source 18 at a position that enables obtaining with detector 28 a neutron count of at least 100,000 counts preferably measured at a rate of at least 20,000 counts per minute and most preferably within the range of from about 20,000 to about 200,000 counts per minute for the counting time employed. It is also important to the effective operation of the process and apparatus of this invention that sample cell 40 is secured between detector 28 and source 18 at a position such that the ratio of the detected signal to the detected noise measured by detector 28 is maintained preferably at a level of at least 3.0 and most preferably within the range of from about 3.0 to about 10.0. It has been found that the magnitude of the neutron counting rate and of the signal to noise ratio is sensitive to the distances between sample cell 40 and source 18 and detector 28. For that reason, the sample cell mounting means 24 should have structure permitting variation of the position of sample cell 40 between detector 28 and source 18. Aside from that element of construction, the structural details of mounting means 24 are not critical to this invention, and mounting means 24 can consist of any connecting means suitable for securing sample cell 40 and collimators 52 and 54 in apparatus 10 and for providing a continuous conduit for the travel of neutrons between the end of tube 12 and the entry of detector 28.

In a specific embodiment of the apparatus shown diagrammatically in FIGURE 2, the radioactive neutron source material 18 consists of ten curies of a mixture of plutonium 239 and beryllium. Tube 12 is constructed of polystyrene or aluminum and has a nominal inner diameter of two inches, and moderating plug 22 consists of a three-inch cylinder of polystyrene having a diameter substantially equal to the inner diameter of tube 12. Mounting means 24 comprises a combination of aluminum connectors for pipe or tubing secured together so as to provide a receptacle for an aluminum sample cell 40.

The thickness of sample cell 40, defined as the perpendicular distance between the inner walls of the cell, is within the range of from 0.5 to 1.0 centimeter to provide for greater sensitivity and more accurate measurements of neutron transmission through material 42. Both sets of collimators 52 and 54 are made of Boral and the central openings through the collimators all have diameters substantially equal to the sensitive diameter of the entry to the detector which, in the specific embodiment described here, was 1.86 inches.

The neutron shield and the collimators can be made of any material capable of absorbing neutrons such as cadmium or Boral. The thermocouple lead 48 employed in the specific embodiment of apparatus 10 is made of copper-constantan. The neutron detector 28 consists of a proportional counter having an inner cylindrical stainless steel liner 56 covered with a cadmium shield 57. Steel liner 56 forms a chamber 58 containing gaseous boron trifluoride. Detector 28 has an outer casing 60 of aluminum that forms an annular chamber 62 with cadmium shield 57. Chamber 62 is filled with boron carbide chips 63 which, in combination with the cadmium shield 57, function to absorb neutrons and reduce the number of non-transmitted neutrons that enter detector 28 to contact sensing element 30.

In the specific embodiment of the apparatus described herein, aluminum sample cell 40 is positioned in mounting means 24 with the center of the sample cell spaced a distance of eight inches from the center of source 18, a distance of four inches from the end of the polystyrene plug 22, and a distance of one and one-half inches from the entry of detector 28.

In the use of apparatus such as that described above, the transmission of neutrons was measured for three hydrocarbon samples with five-minute counting times. The hydrogen concentration in each of those hydrocarbons was calculated from the count of transmitted neutrons by solution of Equation 3a. The results of those determinations of hydrogen concentration are presented in Table I where they are compared with the theoretical hydrogen concentrations of the same three samples. As is shown by the data presented in Table I, the process and apparatus of this invention can provide measurements of the concentration of hydrogen in a hydrocarbon within an accuracy of 0.3 percent difference from the actual hydrogen concentration.

TABLE I.—ACCURACY OF HYDROGEN ANALYSIS BY NEUTRON TRANSMISSION

| Sample | Percent hydrogen by wt. | | Difference | |
|---|---|---|---|---|
| | Experimental | Theoretical | Percent by wt. | Percent diff. |
| Cyclohexane | 14.39 | 14.37 | +0.02 | +0.14 |
| N-octane | 15.85 | 15.88 | −0.03 | −0.19 |
| Cyclopentane | 14.41 | 14.37 | +0.04 | +0.28 |

The specification contained herein describes an improved method and apparatus for measuring the transmission of neutrons through a material and for determining the concentrations of at least one component of that material. The invention disclosed herein comprises a method and an apparatus capable of producing measurements of neutron transmission wherein the magnitude of the neutron count produced by the neutron beam and the ratio of the detected signal to detected noise is maintained within limits that assure determinations of the number of neutrons transmitted, and of the concentrations of the components, with an accuracy and precision hitherto unobtainable by the methods and apparatus described in the prior art. The description of specific materials and manipulative techniques presented herein is not intended to express limitations of the scope of this invention where such limitations would decrease the scope of the invention to less than that defined by the following claims.

Therefore we claim:
1. A method of employing neutron transmission analysis apparatus in the determination of the concentrations of elements contained in a material which comprises
  (a) performing calibration tests to determine the noise of the apparatus and to determine the neutron scattering cross section of the elements present in the material being analyzed
  (b) passing a beam of thermal neutrons through a sample of the material being analyzed
  (c) obtaining a neutron count comprising a signal and noise, and
  (d) expressing the concentration of the element in the material as a function of the signal by substantially eliminating the effect of the noise on the neutron count.

2. A method according to claim 1 in which the neutrons in the neutron beam have an energy no greater than about one electron volt, the neutron count obtained is at least 100,000 counts and the ratio of signal to noise of the neutron count is at least 3.0.

3. A method according to claim 1 which comprises obtaining a neutron count of at least 100,000 counts measured at a rate of from about 20,000 to about 200,000 counts per minute and maintaining the ratio of signal to noise of the neutron count in the range of from 3.0 to about 10.0.

4. A method according to claim 1 which comprises performing calibration tests on at least one standard material of the same elemental composition as the material being analyzed and determining the neutron scattering cross section and the noise by correlating the data obtained.

5. A method according to claim 4 in which performance of the calibration tests comprises
  (a) obtaining a neutron count comprising a signal and noise for each standard (b) relating the neutron scattering cross section of each element contained in the known standard to the signal and noise so as to obtain an initial best value for the neutron scattering cross section of each element and for the noise, and (c) relating the initial best values for the neutron scattering cross section and noise thus obtained to the known concentration of that element in the known standard which is unknown and to be determined in the material of unknown composition so as to obtain the best values for the neutron scattering cross sections and the noise.

6. A method according to claim 5 which comprises obtaining a neutron count of at least 100,000 counts detected at a rate of from about 20,000 to 200,000 counts per minute while maintaining the signal to noise ratio in the range of from about 3.0 to about 10.0.

7. A method according to claim 1 which comprises expressing the concentration of the element being determined as a function of the neutron count and correlating said function with the noise and neutron scattering cross section data obtained from the standard materials.

8. A method according to claim 1 in which the temperature of the material being analyzed is constantly monitored during the period over which the neutron count is obtained, the density of the material is measured at substantially the same temperature as the sample; and the sample density, temperature, the noise, and the neutron scattering cross sections of the elements present in the sample are correlated with the neutron count to determine the concentration of the desired element in the material.

9. A method according to claim 1 in which the concentration of hydrogen present in a material is determined.

10. A method according to claim 1 in which the material is a hydrocarbon.

11. A method according to claim 1 which comprises performing the calibration tests on standard materials having a range of elemental concentrations within which the concentration of the element being determined falls.

12. An apparatus for measuring neutron transmission which comprises, in combination
(a) a source of thermal neutrons
(b) a sample cell in the path of neutrons emitted by the neutron source
(c) collimating means between the neutron source and the sample cell for directing a beam of substantially parallel neutrons to the sample cell
(d) neutron detecting means responsive to neutrons transmitted through the sample cell, the total response so obtained comprising a signal and noise, and
(e) collimating means between the sample cell and the detecting means for directing a beam of substantially parallel transmitted neutrons from the sample cell to the detecting means.

13. An apparatus according to claim 12 in which the neutron detecting means is adapted to provide a neutron count and the neutron source, sample cell, detecting means and both collimating means are so arranged and constructed together with suitable shielding means that the ratio of signal to noise sensed by the detecting means is at least 3.0.

14. An apparatus according to claim 12 in which the means for directing a beam of substantially parallel neutrons to the sample cell comprises the combination of a conductor tube and collimating means, the collimating means being placed between the sample cell and the conductor tube, the conductor tube extending from the neutron source to the collimating means and having a transverse dimension substantially equal to the opening of the collimating means.

15. An apparatus according to claim 12 in which the means for directing the beam of substantially parallel transmitted neutrons from the sample cell to the detecting means comprises a conductor tube and collimating means, the collimating means being placed adjacent the detecting means, the conductor tube extending from the sample cell to the collimating means and having a transverse dimension substantially equal to the opening of the collimating means.

16. An apparatus according to claim 12 in which the thermal neutron source comprises a neutron source having a rate of emission of at least $5 \times 10^6$ neutrons per second with moderating means placed between the neutron source and the sample cell to provide a thermal neutron distribution to the sample cell.

17. An apparatus according to claim 12 in which means are provided for constantly monitoring the temperature of the contents of the sample cell.

18. An apparatus according to claim 12 in which the neutron detecting means comprises a proportional ionization counter for detecting thermal neutrons, amplification means connected to the counter and adapted to amplify the responses of the counter and recording means in connection with the amplifying means for providing a record of the neutron count.

References Cited
UNITED STATES PATENTS

| 2,873,377 | 2/1959 | McKay | 250—83.1 X |
| 3,009,062 | 11/1961 | Brooksbank et al. | 250—83.1 |
| 3,126,481 | 3/1964 | Whittier | 250—83.1 |
| 3,237,009 | 2/1966 | Warman et al. | 250—83.1 |

ARCHIE R. BORCHETT, *Primary Examiner.*

U.S. Cl. X.R.

250—43.5, 105